US012731530B2

(12) United States Patent
Li et al.

(10) Patent No.: US 12,731,530 B2
(45) Date of Patent: Sep. 8, 2026

(54) MICRO-EMITTER DISPLAY HAVING A COLOR-SEGMENTED BACKPLANE

(71) Applicant: GOOGLE LLC, Mountain View, CA (US)

(72) Inventors: Bo Li, Folsom, CA (US); Kaushik Indravadan Sheth, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 12 days.

(21) Appl. No.: 18/799,289

(22) Filed: Aug. 9, 2024

(65) Prior Publication Data

US 2025/0054439 A1 Feb. 13, 2025

Related U.S. Application Data

(60) Provisional application No. 63/519,109, filed on Aug. 11, 2023.

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2310/02* (2013.01); *G09G 2320/0666* (2013.01); *G09G 2320/08* (2013.01); *G09G 2330/023* (2013.01); *G09G 2354/00* (2013.01); *G09G 2360/128* (2013.01); *G09G 2360/144* (2013.01)

(58) Field of Classification Search
CPC .... G09G 3/32; G09G 3/2007; G09G 2310/02; G09G 2320/0666; G09G 2320/08; G09G 2330/023; G09G 2354/00; G09G 2360/128; G09G 2360/144
See application file for complete search history.

(56) References Cited

U.S. PATENT DOCUMENTS

| | | | | |
|---|---|---|---|---|
| 5,091,718 | A * | 2/1992 | Beatty | H01J 29/32 348/382 |
| 6,441,829 | B1 * | 8/2002 | Blalock | G09G 3/3688 345/99 |
| 6,603,469 | B1 * | 8/2003 | Gettemy | G06F 1/3265 345/102 |
| 2005/0243028 | A1 * | 11/2005 | Usui | G09G 3/2946 345/63 |
| 2018/0014022 | A1 * | 1/2018 | Cho | H04N 19/103 |
| 2019/0189045 | A1 * | 6/2019 | Hwang | G09G 3/2003 |
| 2020/0098307 | A1 * | 3/2020 | Li | G09G 3/32 |
| 2020/0251050 | A1 * | 8/2020 | Yee | G09G 3/32 |
| 2023/0386386 | A1 * | 11/2023 | Ng | G09G 3/2022 |

* cited by examiner

*Primary Examiner* — Christopher E Leiby
(74) *Attorney, Agent, or Firm* — Brake Hughes Bellermann LLP

(57) ABSTRACT

A color display that can deactivate colors based on one or more criteria is disclosed. Reducing the number of color channels used to display an image may help conserve power, which may help extend the operating life of a battery-operated device. The display includes a backplane that is segmented by color to enable the deactivation. The segmentation may also reduce electrical loading on the electrical lines used to address the pixels in the backplane.

19 Claims, 8 Drawing Sheets

MICRO-EMITTER DISPLAY HAVING A COLOR-SEGMENTED BACKPLANE

CROSS-REFERENCE TO RELATED APPLICATION

This application claims the benefit of U.S. Provisional Application No. 63/519,109, filed on Aug. 11, 2023, which is hereby incorporated by reference in its entirety.

FIELD OF THE DISCLOSURE

The present disclosure relates to a display and more specifically to a backplane for a display.

BACKGROUND

A micro-emitter display includes pixels that have a switch for toggling the illumination ON/OFF at a high rate to encode a grayscale level onto the light emitted by the pixel. The pixel may further include a static random-access memory cell (i.e., SRAM cell) that can hold the state of the switch to maintain the illumination of the pixel between the toggling. The memory cell for a pixel may be addressed by a backplane. The backplane can include a word-line corresponding to a row of the pixel and a bit-line corresponding to a column of the pixel.

SUMMARY

A color display that includes a backplane that is segmented by color is disclosed. The segmentation allows the display to automatically switch between a variety of color modes based on a variety of criteria. For example, the display may be configured to operate in a reduced color mode (e.g., monochromatic). The segmentation eliminates the need to address inactive color channels in the reduced color mode, which can save power.

In some aspects, the techniques described herein relate to a display including: a pixel array configured to radiate light in color channels, the pixel array including: pixels organized into clusters, the clusters arranged in rows and columns and each pixel in a cluster is configured to radiate one of the color channels; a plurality of bit-lines corresponding each column, wherein each bit-line corresponds to at least one of the color channels of a respective column; and a plurality of word-lines corresponding to each row, wherein each word-line corresponds to at least one of the color channels of a respective row; and a display controller configured to: determine which color channels are active color channels; and address pixels corresponding to the active color channels to display an image received at the display.

In some aspects, the techniques described herein relate to a method including: receiving an image at a display including clusters of pixels configured to radiate light in color channels; designating pixels in each cluster as active-color-channel pixels or inactive-color-channel pixels; addressing the clusters of pixels by word-lines corresponding to the active-color-channel pixels to couple the active-color-channel pixels to respective bit-lines; and writing image data to the active-color-channel pixels via the respective bit-lines to display the image.

In some aspects, the techniques described herein relate to a static random access memory (SRAM) display, the SRAM display including: clusters of pixels arranged in rows and columns, each cluster including at pixels for color channels of the SRAM display, each pixel including a micro-LED configured to radiate light in one of the color channels of the SRAM display according to a state of an SRAM of each pixel; and a display controller configured to: deactivate the pixels of one or more of the color channels to conserve power; and render an image using the pixels of the color channels that have not been deactivated.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
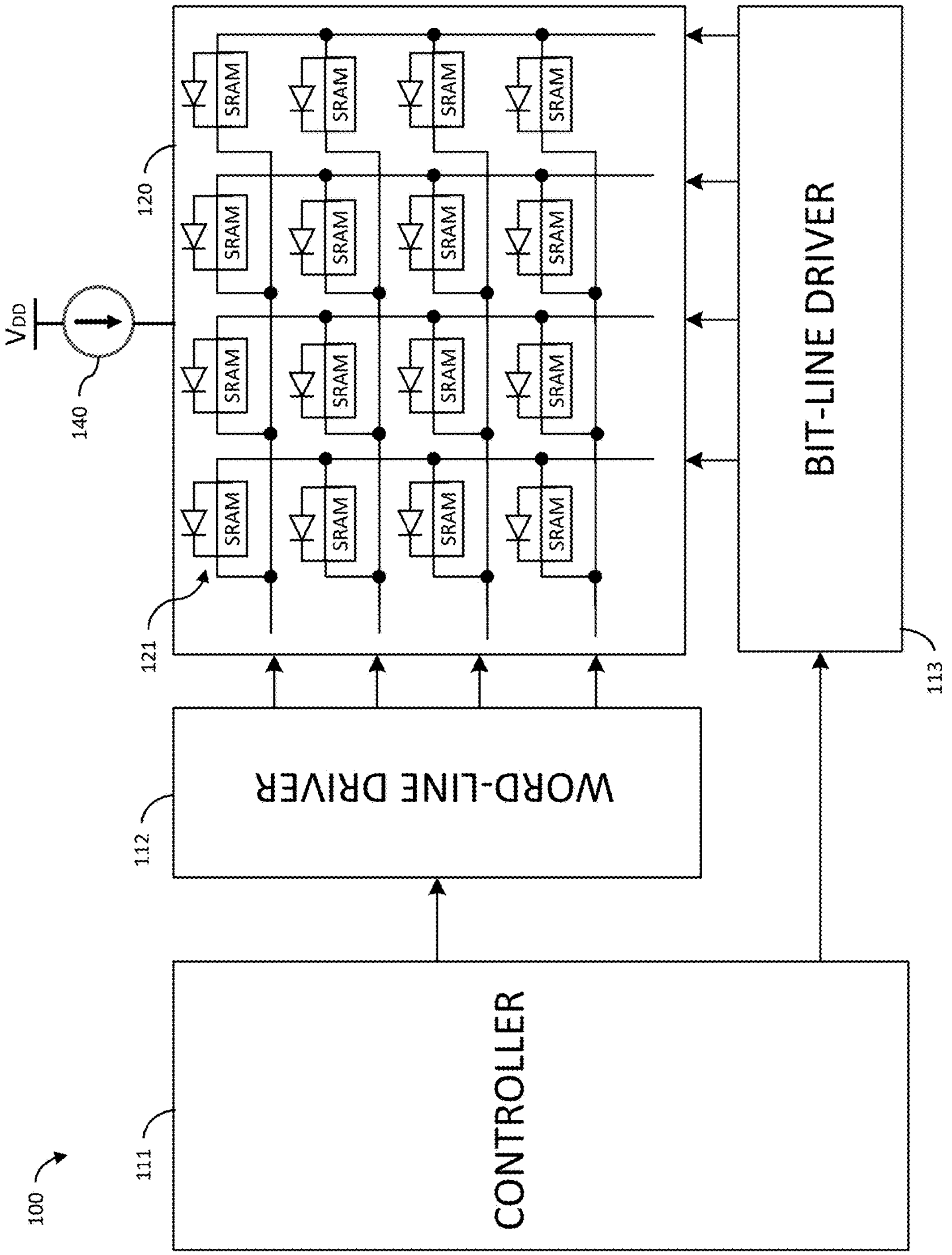
FIG. 1 illustrates a display according to a possible implementation of the present disclosure.

A micro-emitter display, such as a micro-light-emitting-diode display (i.e., micro-LED display) may include millions of pixels, each having dimensions that are a few micrometers (e.g., <10 microns). The display may include pixels that radiate light in a range of colors based on subpixels, which can be configured to radiate primary colors (i.e., color channels) in different proportions to produce different colors. For the purposes of discussion, the subpixels will be referred to as pixels since each is configured to generate light in the same way. The micro-emitter display may utilize a cluster of pixels, with each pixel configured to radiate light at a wavelength corresponding to a particular color channel.

The radiation (i.e., illumination) of a pixel in a micro-LED display may be controlled by the state of a 1-bit memory cell associated with the pixel. Accordingly, the micro-LED display may be referred to as a memory-in-pixel (MIP) display. When the memory cell stores a logical-high (i.e., 1), the pixel may be active (i.e., illuminated, lit) and when the memory element stores a logical-low (i.e. 0), the pixel may be inactive (i.e., not illuminated, dark).

The memory cell may be a static random-access memory (i.e., SRAM) cell, and rendering an image on the display can include writing to an array of SRAM cells (i.e., SRAM). Accordingly, the micro-LED display may be referred to as an SRAM display. The SRAM display is well suited for a planar rendering (i.e., bit plane rendering), which decomposes a grayscale image into multiple binary images (i.e. bit planes), each written to the SRAM in rapid succession (e.g., faster than a flicker threshold of human perception).

A color image can include a grayscale image for each color channel (e.g., red, green, blue), and rendering the color image may include displaying a grayscale image for each color channel on the SRAM display simultaneously. Displaying the grayscale image for each color channel may be carried out using the planar rendering described above. Accordingly, bit planes for each color channel may be displayed on the SRAM display simultaneously.

An SRAM display may include more than a million pixels, which can require multiple millions of ON/OFF write operations per second for bit plane rendering of an image stream. A technical problem with an SRAM display of this size is that the large number of pixels coupled to a single trace in a backplane may electrically load the driver coupled to the trace so that the ON/OFF control of the pixels is slower than desirable. The present disclosure describes an SRAM display that can reduce the electrical loading of word-lines (i.e., rows) to increase the rate at which the SRAM cells of the display can be toggled (e.g., during the bit plane rendering).

The overall power consumed by an SRAM display corresponds to the millions of ON/OFF write operations required to render an image. Another technical problem with the SRAM display (i.e., micro-LED display) is that the overall power consumed is too high for battery operation. For example, a head-mounted display (e.g., augmented reality (AR) glasses or goggles) can require battery operation of a display for, at least, several hours. The disclosed display addresses this technical problem by disabling pixels (i.e., SRAM cells) that are not required to display content to reduce the power consumed. For example, pixels of a color, or colors, that are not used may be disabled. One technical effect of deactivating colors is that power can be conserved to extend the operating lifetime of a battery-operated device (e.g., AR glasses, AR goggles, smart watch, etc.) using the display.

FIG. 1 is a schematic block diagram of a display according to a possible implementation of the present disclosure. The display 100 includes a plurality of pixels arranged in a 2D grid (i.e., pixel array 120). Each pixel 121 includes a micro-LED configured to generate light while conducting a drive current from a drive current module 140. Each pixel 121 includes a memory cell (e.g., SRAM cell) for setting and maintaining the illumination state of a micro-LED as ON or OFF. The state of an SRAM cell of a pixel can be controlled (i.e., set/reset) by a signal (e.g., bit-line signal) transmitted over a column conductor (i.e., bit-line) coupled to the SRAM cell. The SRAM cell of the pixel is coupled to the bit-line based on a signal (e.g., word-line signal) transmitted over a row conductor (i.e., word-line) to the pixel. Accordingly, the display 100 further includes a word-line driver 112 configured to transmit a word-line signal to a word-line (i.e., row) of the pixel array 120. The word-line signal can activate a row so that each pixel in an active row is coupled to its respective bit-line.

As shown in FIG. 1, the display 100 further includes a bit-line driver 113 configured to transmit bit-line signals to the bit-lines of the pixels in an active row. The bit-line signals may change or maintain the state of the SRAMs in the active row according to an image for display. In a possible implementation, a bit-line signal is a differential signal. In this case, each bit-line may include a positive bit-line (BL+) configured to carry a positive bit-line signal and a negative bit-line configured to carry a negative bit-line signal (BL−). In this differential configuration, the positive bit-line and the negative bit-line may be referred to collectively as the bit-line.

The display 100 further includes a controller 111 configured to control the operation of the word-line driver 112 and the bit-line driver 113. For example, the controller may activate a row and then transmit the image data for the columns of the activated row.

The controller 111 may be configured to address and write to the SRAMs of the pixel array so that the micro-LEDs are illuminated to generate an image. Each image may be rendered on the pixel array 120 on a row-by-row basis until every row necessary for rendering the image has been activated. In a possible implementation, a rendering process includes transmitting a word-line signal to activate a row. After being activated, a bit-line signal for each pixel in the row controls the pixel ON/OFF according to the image data for each pixel in the active row. After the bit-line signals configure (i.e., write to) the pixels of the active row, the row may be deactivated, and another row may be activated until all rows of a frame have been activated. The SRAM cells for pixels in deactivated rows can hold the pixels of the deactivated rows ON (illuminated) or OFF (not illuminated) while the other rows of the frame are activated. After writing a frame to the SRAM cells of the pixel array 120, the SRAM cells can hold their values until they are changed. As a result, updating the values in an SRAM display may only require a portion of the SRAM cells to change their state (i.e., flip) from a previous frame (i.e., bit plane).

Power is consumed by an SRAM display in a variety of ways. First, lit pixels may consume more power than dark pixels. Dark pixels may consume almost no power (e.g., zero power). Second, flipping the state of the SRAM cell (i.e., writing) may consume more power than maintaining the state of the SRAM cell. Maintaining the state of the SRAM cell may consume almost no power (e.g., zero power). Third, addressing all the SRAM cells in the pixel array for rendering a frame may consume more power than addressing a portion of the SRAM cells in the pixel array. For example, the SRAM can be programmed by engaging all word-lines and bit-lines (e.g., >1000 word-lines, >1000 bit-lines) at each frame. In this case, the power consumed by the logic (e.g., gates) and registers for addressing the pixels corresponds to the entire pixel array even if not all pixels in the pixel array are required. The SRAM display of the present disclosure can address pixels that correspond to active color channels (i.e., active-color-channel pixels) and not address pixels that correspond to deactivated color channels (i.e., inactive-color-channel pixels). The inactive-color-channel pixels can be reactivated whenever necessary so the power consumed by the display can change over time. This change can result in an average power reduction without sacrificing the performance (e.g., viewing area) of the display.

Figure 2:
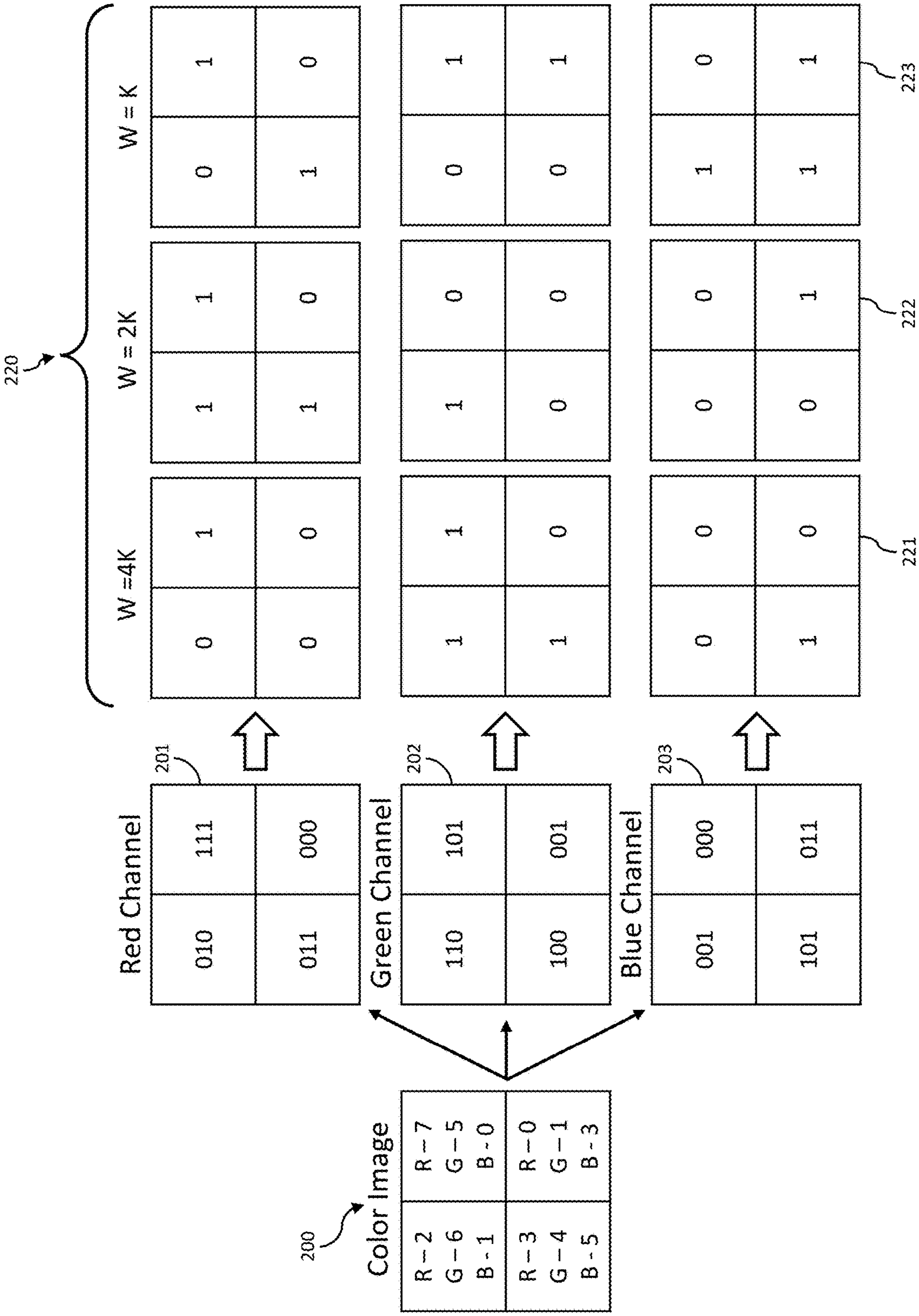
FIG. 2 illustrates bit plane rendering for displaying a color image according to a possible implementation of the present disclosure.

FIG. 2 illustrates bit plane rendering for displaying a color image according to a possible implementation of the present disclosure. In this example, a color image 200 has four pixels. Each pixel defines a location and a first grayscale level of a red channel (i.e., R), a second grayscale level of a green channel (i.e., G), and a third grayscale level of a blue channel (i.e., B). The gray scale level for each color channel may be represented as a binary value including a number of bits corresponding to the bit depth of the display. As shown, each binary value includes three bits.

The color image may be divided into a red channel image 201, a green channel image 202, and a blue channel image

203. The red channel image 201 is a first grayscale image, the green channel image 202 is a second grayscale image, and the blue channel image 203 is a third grayscale image. The pixels of each color channel image include pixels that are binary representations of the corresponding grayscale levels.

A bit plane sequence 220 can be generated for each color channel image based on the bits of the pixels. For example, a pixel having a binary value of 011 may be represented in a bit plane sequence 220 as a 0 in the pixel of the first bit plane 221, as a 1 in the pixel of a second bit plane 222, and as a 1 in the pixel of a third bit plane 223.

The first bit plane of the bit plane sequence 220 represents the most significant bits (e.g., MSB) of the color channel image, which can include the most information visually. The last bit plane of the bit plane sequence 220 represents the least significant bits (e.g., LSB) of the color channel image, which can include the least information visually. Displaying the color image may include writing the bit plane sequences for each color channel to the pixel array.

The bit planes may be weighted and displayed in rapid succession so that a viewer sees the grayscale level for each pixel instead of the binary values. The weighting of the bit planes may be carried out by adjusting the ON light levels of each bit plane, which can be managed using pulse width modulation (PWM) applied to the micro-LED. Alternatively, the weighting of the bit planes may be carried out by adjusting how long each bit plane is displayed in the bit plane sequence. The MSB bit plane may be weighted higher than the LSB bit plane. As shown, the weights (W) of the bit planes may double for each bit plane from the LSB bit plane to the MSB bit plane.

Figure 3:
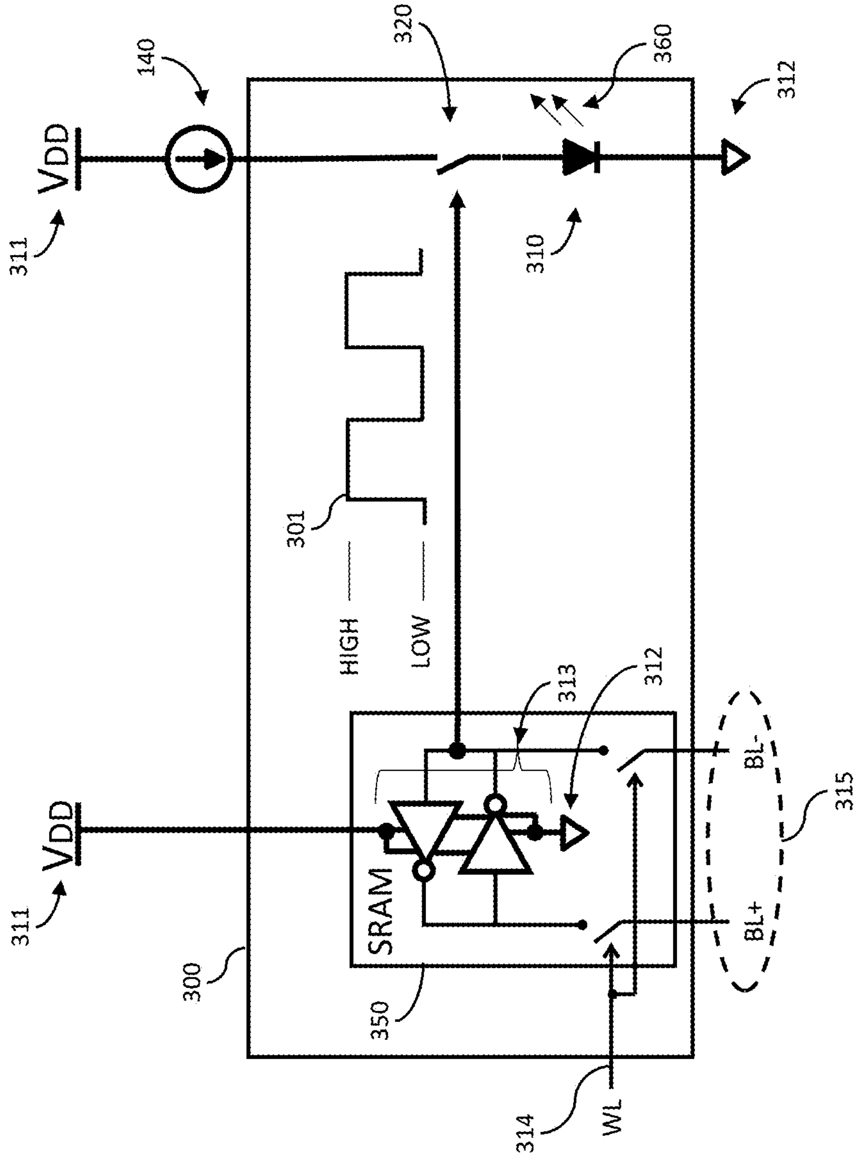
FIG. 3 illustrates a pixel for a display according to a possible implementation of the present disclosure.

FIG. 3 illustrates a pixel for a display according to a possible implementation of the present disclosure. As shown in FIG. 3, the pixel 300 includes a switch 320 coupled between a micro-LED 310 and the drive current module 140. The switch 320 can be in a short circuit state (i.e., ON-condition) so that the micro-LED 310 is illuminated (i.e., generates light 360) by the current of the drive current module 140. Alternatively, the switch 320 can be in an open circuit state (i.e., OFF-condition) so that the micro-LED 310 is dark because it receives no current.

The light 360 generated by the micro-LED 310 can be a color (i.e., one color) in the visible spectrum (e.g., red, green, blue). The color may be determined by a property (e.g., bandgap) and a configuration (e.g., material, doping, current, etc.) of the micro-LED 310. The pixel array 120 may include a first group of pixels having micro-LEDs configured to radiate red light, a second group of pixels having micro-LEDs configured to radiate green light, and a third group of pixels having micro-LEDs configured to radiate blue light. A cluster of pixels can include at least one pixel from the first group, at least one pixel from the second group and at least one pixel from the third group. In a possible implementation, a cluster includes a green pixel, a blue pixel, and two red pixels. The extra red pixel can help increase the brightness of the red color channel to a user, which may otherwise be lower than the other channels due to a semiconductor (e.g., Si) efficiency and/or a sensitivity of the eye of a user.

As shown in FIG. 3, the switch 320 can be controlled ON or OFF according to the state (i.e., the stored value) of an SRAM cell 350. The SRAM cell 350 receives power for operation from a power supply 311 which is coupled to each pixel of the pixel array 120. The SRAM cell 350 may be configured to output a HIGH voltage (e.g., $V_{DD}$) while in a HIGH state (i.e., ON-state) or output a LOW voltage (e.g., ground) while in a LOW state (i.e., OFF-state). An advantage of using an SRAM cell 350 to control the switch 320 is that while the SRAM cell 350 is in the HIGH-state (i.e., ON-state) or the LOW-state (i.e., OFF-state) it consumes very little current (e.g., approximately zero current) from the power supply 311. The SRAM cell 350 draws current (e.g., a shoot-through current) as it is transitioned (i.e., is flipped) between states during a write operation.

As shown in FIG. 3, the SRAM cell 350 includes two inverters (i.e., a pair of inverters) coupled in parallel with their polarities reversed (i.e., coupled output to input). The pair of inverters function as a digital latch circuit (i.e., latch 313). A write operation (i.e., write process) configures latch 313 into one of two states: an ON-state to output a signal corresponding to a logical HIGH (i.e., 1) and an OFF-state to output a signal corresponding to a logical LOW (i.e., 0).

As shown in FIG. 3, the pixel 300 further includes a bit-line 315, and the state of the SRAM cell 350 may be set/reset by bit-line signals (BL+, BL−) applied to the bit-line 315. During the write operation, the signals (BL+, BL−) are set to assert the desired state onto the latch 313. Once the desired state is set and the output of the latch 313 is stable, the signals (BL+, BL−) may be removed.

As shown in FIG. 3, the pixel 300 further includes a word-line 314. During the write operation, the latch circuit is coupled to the positive/negative signals of the bit-line 315 by switches controlled by a word-line signal (WL) transmitted on a word-line 314. For example, a first level (e.g., HIGH) on the word-line 314 turns the switches ON to couple the input/output of latch 313 to respective positive/negative lines of the bit-line 315. A second level (e.g., LOW) on the word-line 314 turns the switches OFF to decouple the input/output of the latch 313 from the bit-line drivers so that the state is stored. The state of the SRAM cell 350 can appear as a voltage at the output of one of the inverters of the latch 313. The voltage at the output can be toggled between a high level (i.e., HIGH) and a low level (i.e., LOW) according to a pulse width modulation signal (i.e. PWM signal 301). A perceived intensity of light from the micro-LED 310 may correspond to a duty cycle of the PWM signal 301.

Changing the state of the latch (i.e., flipping the latch) can include changing the ON/OFF condition of the transistors in each inverter. While the transistors are changing, a low-resistance path to ground 312 may be created, and a shoot-through current may flow from the power supply 311 to the SRAM cell 350 until the transition is completed. This shoot-through current may be relatively large and corresponds to the power consumed by the write operation.

Figure 4:
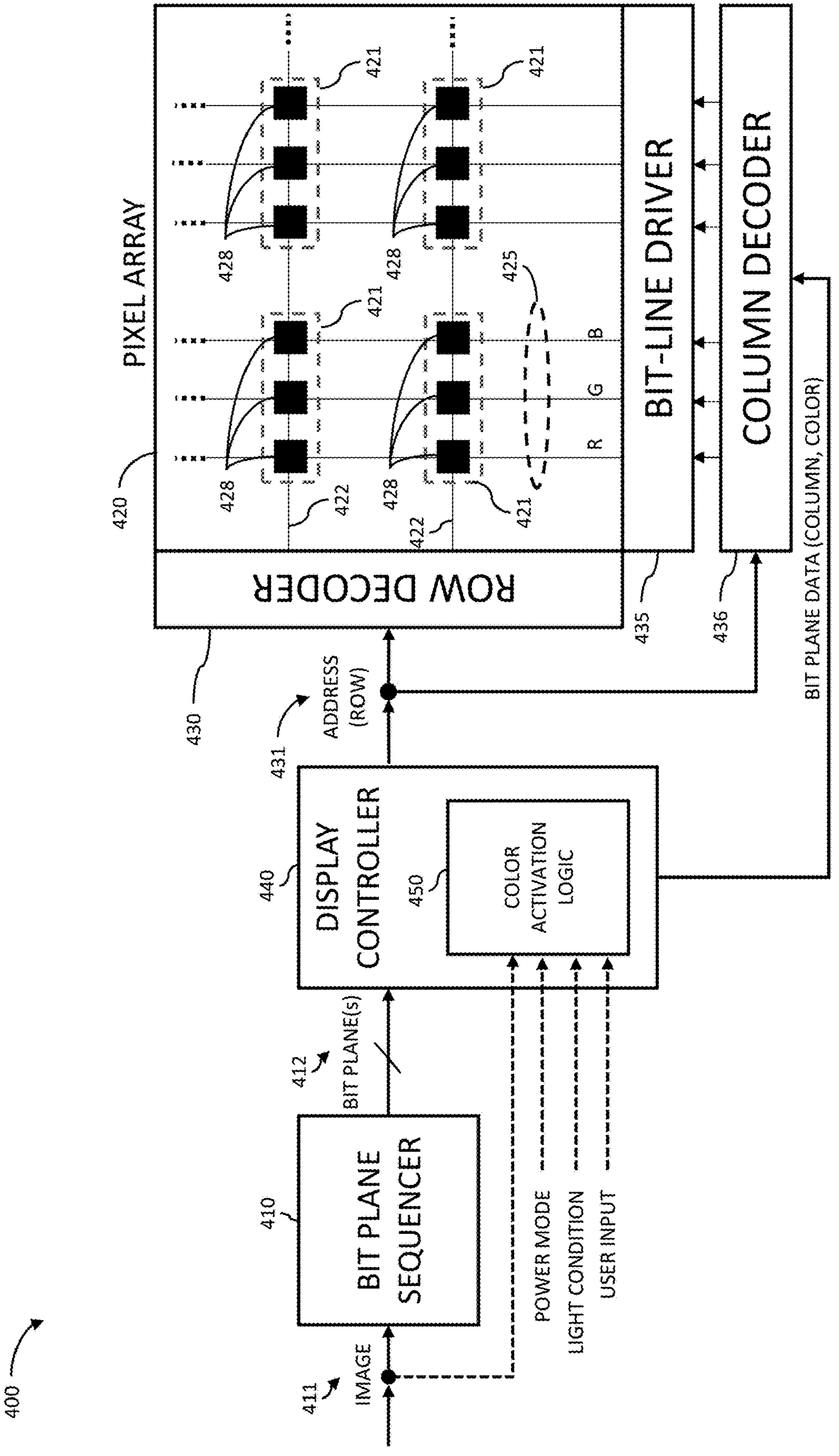
FIG. 4 illustrates a display according to a possible implementation of the present disclosure.

FIG. 4 is a display according to a possible implementation of the present disclosure. The display 400 is configured to receive an image 411 for display on a pixel array 420. The image 411 may be singular or may be included as a frame in a sequence (e.g., video). The image 411 may include content that can include text, pictures, icons, and the like. In some cases, the content may be polychromatic (e.g., white, full-color), requiring all color channels of the display. In some cases, the content may be dichromatic (e.g., yellow, magenta, cyan), requiring two color channels of the display. In some cases, the content may be monochromatic (e.g., red, green, blue), requiring one color channel of the display.

The pixel array 420 may include clusters 421 of pixels 428. Each cluster can include pixels 428 configured to radiate at color channels of the display. Each cluster may include a number of pixels that is greater than or equal to a number of the color channels of the display. The physical arrangement of the pixels 428 in the clusters 421 may be one dimensional or two dimensional. The pixels in each cluster 421 can be configured to radiate at the color channels of red, green, and blue. The clusters may be addressed by row and column by conductors in a back-plane of the pixel array 420.

As shown in FIG. 4, the back-plane includes word-lines 422 to address the clusters by row. As shown, each row can be addressed by a corresponding a word-line 422. For example, a word-line signal may be transmitted to the clusters on the row to couple the pixels 428 of the clusters to their respective bit-lines (i.e., R, G, B). In other words, all color channels of a cluster may be activated by one word line.

As shown in FIG. 4, the back-plane further includes bit-lines to address the clusters by column. Each column 425 can include bit-lines corresponding to the color channels of the display. As shown, three-bit lines (R, G, B) are coupled to the three corresponding pixels (i.e., red (R), green (G), blue (B)) of each cluster in a column 425.

The display 400 includes a bit plane sequencer 410. The bit plane sequencer 410 is configured to receive the image 411 for display and to output one or more bit planes based on the image 411. For example, the bit plane sequencer 410 may be configured to output a sequence of bit planes for each color channel of the display (e.g., red, green, blue). In a possible implementation, when the image 411 is dichromatic or monochromatic, some of the color channel bit-planes will include no visual information (e.g., all zeros).

The display 400 further includes a display controller 440 (i.e., controller) configured to generate write operations to configure the pixels to render the image 411 on the display. A write operation can include addressing pixels of the clusters in each row and column. The disclosed display can further address the pixels within a cluster by its color channel. As a result, the display controller 440 may be configured to write to a pixel of a cluster based on the column of its cluster, the row of its cluster, and its color within the cluster.

The display controller 440 may include color-activation logic 450. The color-activation logic 450 can include software instructions and/or digital logic circuits configured to determine the color channels (i.e., colors) of the pixel array are active (i.e., active color channels) and/or determine the color channels (i.e., colors) of the pixel array are inactive (i.e., inactive color channels) based on a plurality of inputs and/or conditions.

The display controller 440 may adjust how it addresses the pixel array 420 based on the results of the color-activation logic 450. For example, the display controller 440 may not address (e.g., may not write to) pixels of an inactive color channels (i.e., inactive-color-channel pixels), and/or the display controller 440 may address (e.g., may write to) pixels of active color to display an image. Not addressing the pixels corresponding to the inactive color channels can reduce the power consumed while displaying the image.

The color-activation logic 450 may be configured to designate active-color-channel pixels and inactive-color-channel pixels based on a variety of inputs and/or conditions. The designation can change how the display controller interacts with the back-plane of the pixel array to address the pixels when rendering the image on the pixel array 420.

In a possible implementation, the image 411 may help determine the active color channels (and inactive color channels). The display controller 440 may be configured to address pixels of all color channels (e.g., red, green, blue) when the image is part of a video stream (i.e., video). In a possible implementation, the detection may include sensing a data pattern at an input of the display 400.

In another possible implementation, the content of the image 411 may help determine the active color channels. The display controller 440 may be configured to address one color channel (e.g., green) when the content is detected as text. In a possible implementation, the detection may include sensing the text (e.g., optical character recognition) in the image.

In a possible implementation, a power mode of the display or of a device in which the display is integrated, can help determine the active color channels (and inactive color channels). In a possible implementation, the display 400 may be configured to operate in a high-power mode, which can be characterized by all color channels (e.g., red, green, blue) being active. The display 400 may be further configured to operate in a low-power mode, which can be characterized by one color channel (e.g., green) being active. Operating in the low-power mode may consume less power than operating in the high-power mode because fewer pixels need to be addressed in the low-power mode and because fewer pixels draw current for illumination.

In a possible implementation, the selection of the power mode may be triggered by the device in which the display 400 is integrated. For example, a smart watch using the display may enter a low power mode when its battery level reaches a low threshold level (i.e., based on a battery level). The device may then trigger the display to operate in the low-power mode to reduce the amount of power the display 400 consumes from the battery.

A low-power mode may also be triggered by a period of inactivity of the display or a device including the display. For example, the smart watch may include an inertial measurement unit configured to sense movement of the smart watch. The smart watch may transmit a power-mode signal to configure the display in a low power mode when the smart watch has not moved for a period longer than a threshold time. In the low-power mode, the display may render content of the smart watch (e.g., the time) using pixels of one color channel.

In a possible implementation, a light condition of the display, or of a device in which the display is integrated, can help determine the active color channels (and inactive color channels). For example, the display may be coupled to a light sensor to receive a measurement of a light condition. In a possible implementation, a device (e.g., AR glasses, AR goggles) in which the display 400 is integrated may include the light sensor to measure an ambient light condition of the environment. The light condition may trigger the color-activation logic 450 of the display controller 440 to activate or deactivate certain color channels. For example, when the light condition is above a threshold (i.e., bright light condition), the display controller 440 may address the back-plane to display all color channels (e.g., red, green, blue). Displaying all color channels may help increase the brightness of the display. In another example, when the light condition is below a threshold (i.e., dim light condition), the display controller 440 may address the back-plane to display to one color channel (e.g., red). Displaying one color channel can help preserve the night vision of the user, which may be helpful in a dim light condition.

In a possible implementation a user input can determine the active color channels (and inactive color channels). For example, a user may be provided control of the display 400 via a user interface (i.e., UI). The user may interact with the UI to select the active colors of the display. For example, the user may select a dichromatic color (e.g., yellow, magenta, cyan) in which a first color channel and a second color channel are active, and a third color channel is inactive. In another example, the user may select a monochromatic color (e.g., red, green, blue) in which a first color channel is active and the other color channels are inactive. The selection may be based on the user's preference.

As shown, the display controller 440 can write to a pixel (i.e., SRAM cell) of the pixel array 420 based on its corresponding value/weight in a bit plane 412. To write to the pixel array 420, the display controller 440 may be configured to transmit an address 431 to a row decoder 430 of the display 400 in order to activate a row of the pixel array 420. In a possible implementation, the row decoder 430 is configured to route a word-line signal to the word-line of a row based on an address 431 that can include a first identifier corresponding to a row number. a second identifier corresponding to the color channel (or color channels) of the row.

The display 400 further includes a column decoder 436 configured to route the bit plane data to the appropriate columns of an active row. The column decoder 436 may be configured to only route the bit plane data to active colors of the active row. In other words, the column decoder 436 may ignore columns of pixels in inactive colors. Eliminating the logic and registers required to route image data, which carries no visual information, to inactive segments can reduce the power consumed by the display. The display 400 may include a buffer (not shown) between the display controller 440 and the column decoder 436 to provide the proper timing between a row activation and routing of image data.

The column decoder 436 can be coupled to a bit-line driver 435 of the row decoder 430. The bit-line driver 435 may include an amplifier for each column of the display. The amplifiers may buffer the digital logic and circuitry of the column decoder from the SRAM cells of the pixel array 420, which can draw a relatively high amount of power during a write operation. The amplifiers of the bit-line driver 435 are configured to supply the current necessary to flip the state of the latch in the SRAM cell, which was described in conjunction with FIG. 3. The amplifiers for columns of inactive colors may be deactivated to further save power. Accordingly, in a possible implementation the bit-line driver 435 may be subdivided into a plurality of bit-line drivers, each corresponding to a color of the pixel array 420, so that bit-line drivers corresponding to inactive segments may be deactivated to save power.

Architectures for addressing the active-color-channel pixels by row and column may balance power reduction with complexity. For example, a row having one word-line for each color channel provides the most versatility to address color channels but requires area for the extra word-lines. Conversely, a row having one word-line for all color channels provides the least versatility to address color channels but may correspond to the simplest and most compact backplane. A few possible implementations illustrating these differences are provided in what follows.

Figure 5:
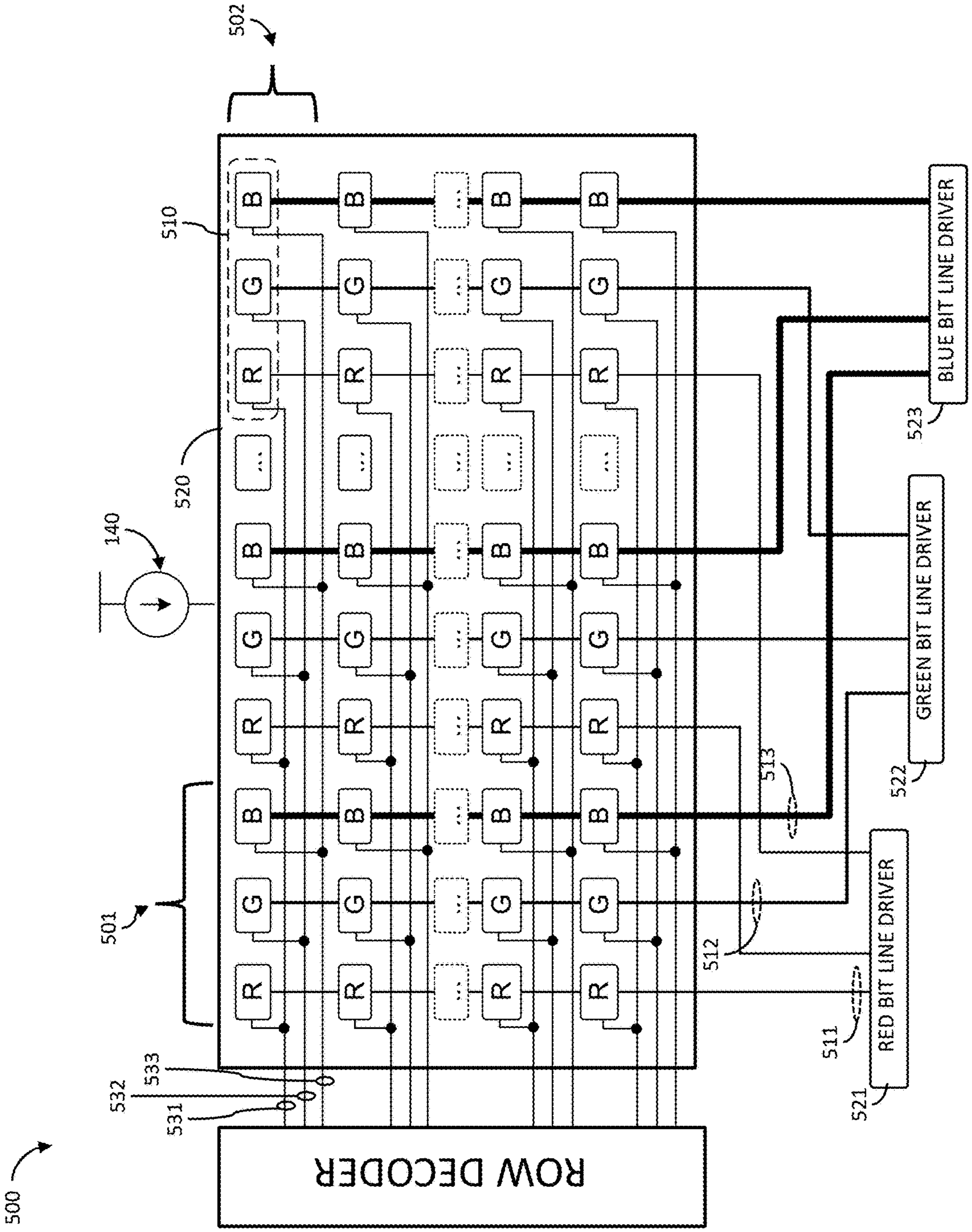
FIG. 5 illustrates a display with a color-segmented backplane according to a first possible implementation of the present disclosure.

FIG. 5 illustrates a display with a color-segmented backplane according to a first possible implementation of the present disclosure. The display 500 includes a pixel array 520 that includes pixels configured to radiate in a red color channel, a green color channel, and a blue color channel. The pixels are arranged (i.e. organized) in clusters with each cluster 510 including a red pixel (R), a green pixel (G), and a blue pixel (B). The pixels in each cluster are arranged in a 1-D pattern (i.e., a line).

The clusters are arranged in rows and columns. Each row 502 includes multiple word-lines. Each word-line corresponds to at least one color channel and is coupled to the pixels in each cluster of a row that correspond to these color channels. As shown, the row 502 includes a red word-line 531 coupled to the red pixels (R) of the row, a green word-line 532 coupled to the green pixels (G) of the row, and a blue word-line 533 coupled to the blue pixels of the row (i.e., three word-lines). Each word line is coupled to the pixels of the corresponding color channel. Addressing the pixel may include activating only the word-lines only coupled to the pixels of active color channels. For example, a green monochromatic image may be rendered by transmitting a green word-line signal on the green word-line 532 to couple the green pixels to their corresponding bit lines. In this case, no word-line signal may be transmitted for the red color channel of the blue color channel. In other words, the row decoder may activate the green word-line of the row and ignore the other word-lines of the row. The power consumed by the row decoder may be reduced by ignoring the other word-lines of each row.

Each column 501 includes multiple bit-lines. Each bit-line corresponds to at least one color channel of the display and is coupled to the pixels in each cluster of a column that correspond to these color channels. As shown, a column 501 includes a red-bit line 511 coupled to the red pixels (R) of the column, a green bit line 512 coupled to the green pixels (G) of the column 501, and a blue bit line 513 coupled to the blue pixels (B) of the column 501.

The display 500 may include a red bit-line driver 521 configured to write image data to the red pixels (R) when they are activated (i.e., addressed) in a row. The display 500 may include a green bit-line driver 522 configured to write image data to the green pixels (G) when they are activated (i.e., addressed) in a row. The display 500 may include a blue bit-line driver 523 configured to write image data to the blue pixels (B) when they are activated (i.e., addressed) in a row.

Only pixels of an active color channel may be activated and written to. For example, a green monochromatic image may be rendered on the display 500 by activated in the green word-line 532 and transmitting the image data (e.g., green bit plane data) to the green pixels via the green bit-lines to write to the SRAM cells of the green pixels in the activated row. Displaying the green monochromatic image can reduce power consumption (compared to full color operation) by disabling the logic and registers (e.g., in the row decoder) for all color channels but green. What is more, this configuration provides power savings by being able to disable the red bit-line driver 521 and the blue bit-line driver 523 while rendering the green monochromatic image.

The implementation shown in FIG. 5 provides versatility in adjusting the color channels based on the dedicated word-lines and bit-lines. The one-dimensional cluster used in this implementation, however, may not be as desirable as a two-dimensional cluster because of pixel fabrication and the density of the word-lines and bit-lines.

Figure 6:
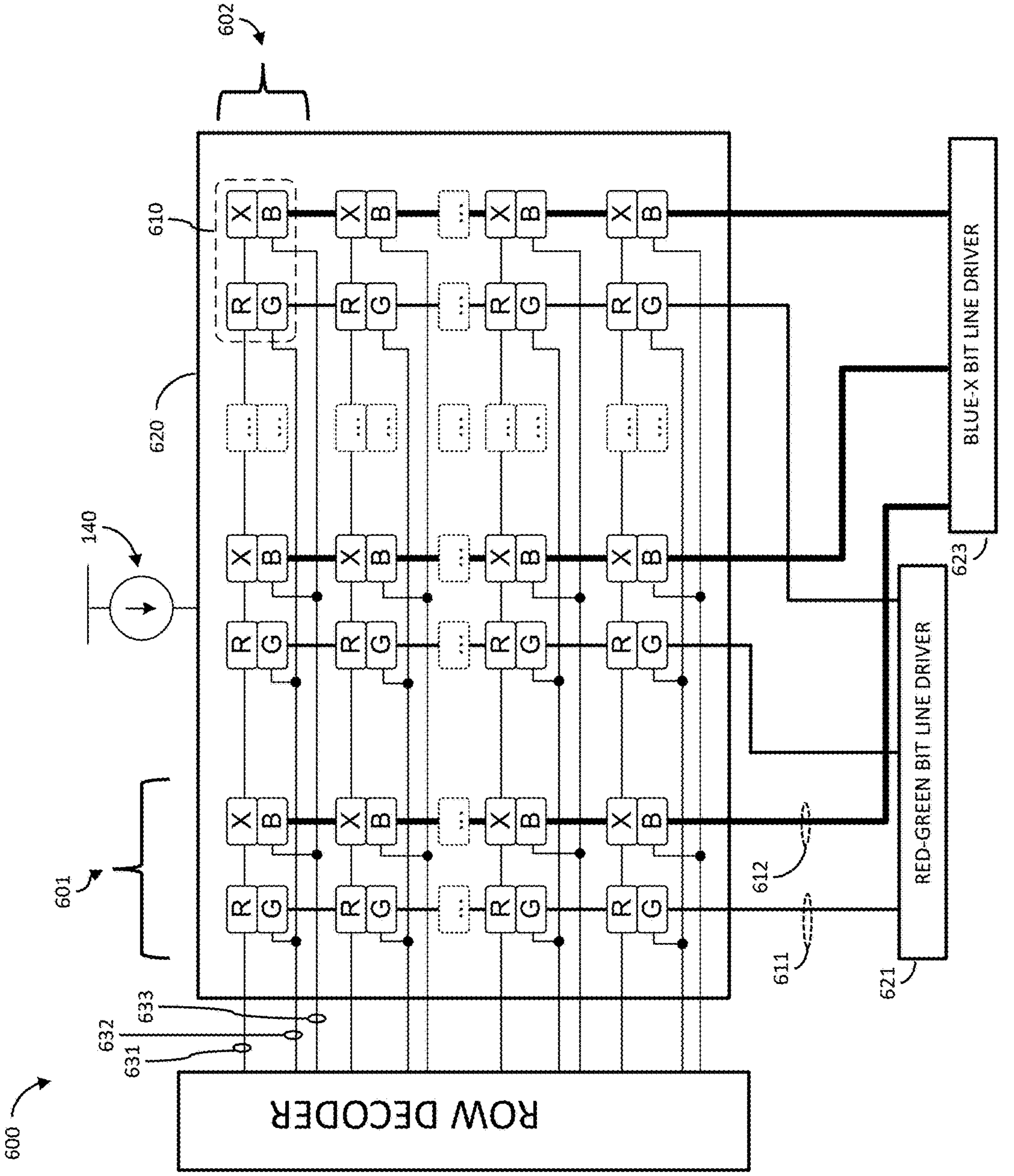
FIG. 6 illustrates display with a color-segmented backplane according to a second possible implementation of the present disclosure.

FIG. 6 illustrates display with a color-segmented backplane according to a second possible implementation of the present disclosure. The display 600 includes a pixel array 620 that includes pixels configured to radiate in multiple color channels. The pixels are arranged in clusters that include pixels arranged in a 2-D pattern (i.e., a square). As shown, each cluster 610 includes a red pixel (R), a green pixel (G), a blue pixel (B), and a selectable pixel (X). The selectable pixel (X) can be any of the color channels. In a possible implementation, the selectable pixel may be unpopulated in the pixel array 620 so that each cluster includes one pixel for each color channel. In another possible implementation, the selectable pixel (X) can be a duplicate of a color channel already in the cluster. For example, the selectable pixel (X) can be a red pixel (R) to increase the brightness of the red color channel radiated by the display. In still another possible implementation, the selectable pixel (X) can be a different color channel than the other pixels in the cluster so that the cluster includes four color channels. For example, the selectable pixel can be a yellow pixel (e.g., Y) to increase a range of viewable colors.

The clusters are arranged in rows and columns. Each row 602 includes multiple word-lines. Each word-line corresponds to at least one color channel and is coupled to the pixels in each cluster of a row that correspond to these color channels. As shown, the row 602 includes a red-X word-line 631 coupled to the red pixels (R) and the selectable pixels (X) (e.g., red pixels) of the row. The row 602 further includes a green word-line 632 coupled to the green pixels (G) of the row and a blue word-line 633 coupled to the blue pixels of the row. As shown, the number of word-lines matches the number of color channels when the selectable pixel is a red pixel. Addressing the pixel may include activating only the word lines to activate only pixels of active color channels.

Each column 601 includes multiple bit-lines. Each bit-line corresponds to at least one color channel of the display and is coupled to the pixels in each cluster of a column that correspond to these color channels. As shown, a column 601 includes a red-green bit line 611 coupled to the red pixels (R) and the green pixels (G) of the column. The column further includes a blue-X bit line 612 (e.g., blue-red bit line) coupled to the blue pixels (B) and the selectable pixels (X) (e.g., red pixels) of the column 601. The display 600 may include a red-green bit-line driver 621 configured to write image data to the red pixels and green pixels of the activated (i.e., addressed) row. The display 600 may include a blue-X bit-line driver 623 configured to write image data to the blue pixels and selectable pixels (e.g., red pixels) of the activated (i.e., addressed) row. Writing to the pixel array 620 may include activating pixels of active color channels by their respective word lines. For example, a green monochromatic image may be rendered by activating a green word-line 632 and transmitting image data (e.g., green bit plane data) to a green pixel via a red-green bit line 611 to write to the SRAM cell of the green pixel.

The implementation shown in FIG. 6 provides square clusters with versatility in adjusting the color channels. This implementation can reduce power consumption by disabling the logic and registers (e.g., in the row decoder) for one or more word-lines in a row. What is more, this configuration provides power savings by being able to disable the bit-line drivers for inactive color channels. The three word-lines used in this implementation may be more complex than desirable when the pixel pitch is very small (e.g., <10 microns). Accordingly, it may be desirable to reduce the number of word-lines per row.

Figure 7:
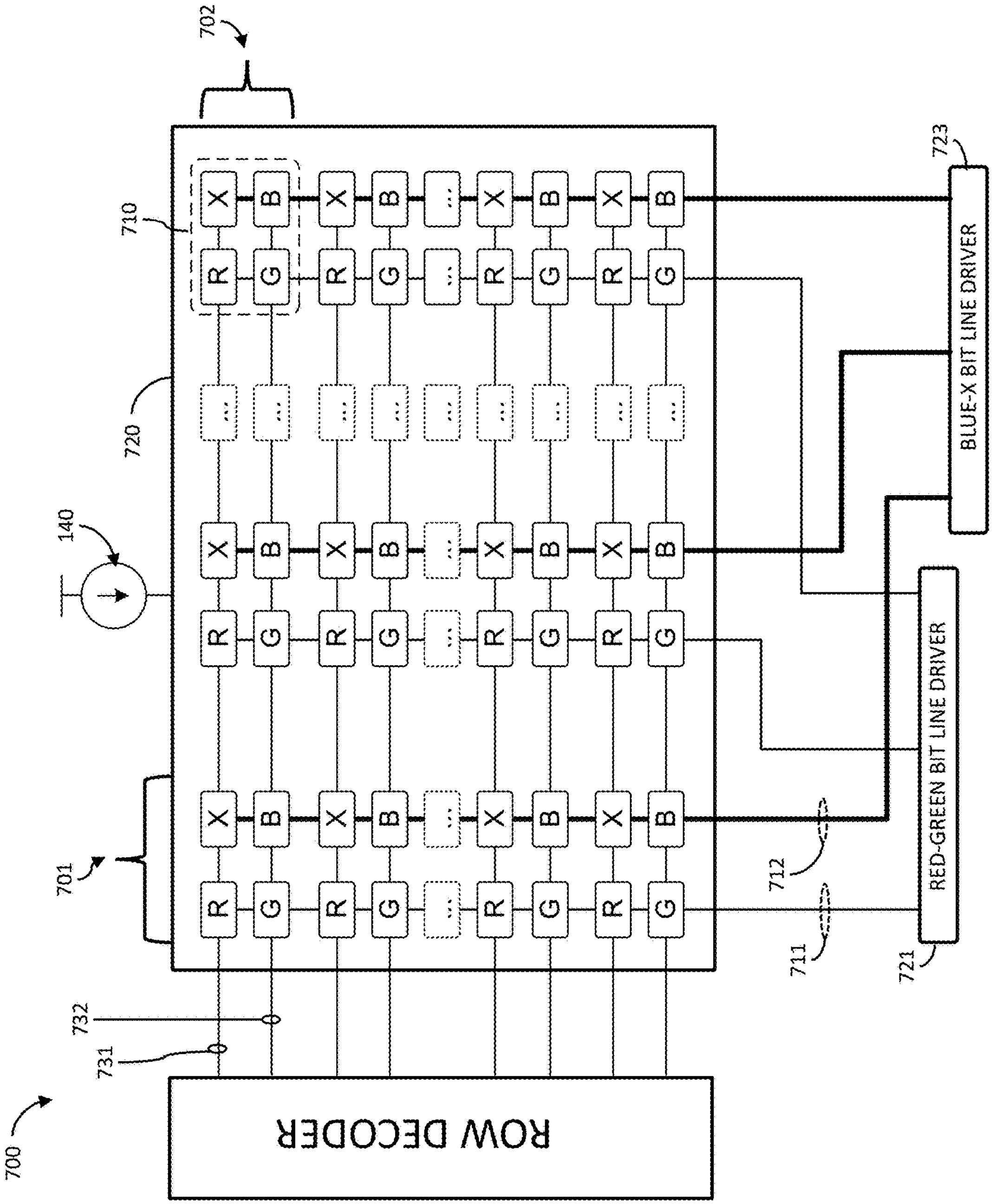
FIG. 7 illustrates a display with a color-segmented backplane according to a third possible implementation of the present disclosure.

FIG. 7 illustrates a display with a color-segmented backplane according to a third possible implementation of the present disclosure. The display 700 includes a pixel array 720 that includes pixels configured to radiate in multiple color channels. The pixels are arranged in clusters that include pixels arranged in a 2-D pattern (i.e., a square). As shown, each cluster 610 includes a red pixel (R), a green pixel (G), a blue pixel (B), and a selectable pixel (X). The selectable pixel (X) can be unpopulated, a pixel matching one of the other color channels in the cluster, or a pixel not matching any of the other color channels, as described previously.

The clusters are arranged in rows and columns. Each row 702 includes multiple word-lines, but unlike the previous implementation, that included word-lines for each color channel here pixels of different color channels share word-lines. In other words, the number of word-lines matches the number of rows in the cluster 710. As shown, the row 702 includes a red-X word-line 731 coupled to the red pixel (R) and the selectable pixel (X) (e.g., 2$^{nd}$ red pixel (R)) of each cluster 610. The row 702 further includes a green-blue word-line 732 coupled to the green pixel (G) and the blue pixel (B) of each cluster. As shown, the number of word-lines (i.e., 2) does not match the number of color channels (e.g., 3). As a result, some pixels (e.g., green and blue) share a word-line. Addressing the pixel may include activating only the word lines to activate only pixels of active color channels.

Each column 701 includes multiple bit-lines. Each bit-line corresponds to at least one color channel of the display and is coupled to the pixels in each cluster of a column that correspond to these color channels. As shown, column 601 includes a red-green bit-line 711 coupled to the red pixels (R) and the green pixels (G) of the column. The column further includes a blue-X bit line 712 (e.g., blue-red bit line) coupled to the blue pixels (B) and the selectable pixels (X) (e.g., red pixels) of the column 701. The display 700 may include a red-green bit-line driver 721 configured to write image data to the red pixels and green pixels of the activated (i.e., addressed) row. The display 700 may include a blue-X bit-line driver 723 configured to write image data to the blue pixels and selectable pixels (e.g., red pixels) of the activated (i.e., addressed) row. Writing to the pixel array 720 may include activating pixels of active color channels by their respective word lines. For example, a green monochromatic image may be rendered by activating a green-blue word-line 732 and transmitting image data (e.g., green bit plane data) to a green pixel via a red-green bit-line 711 to write to the SRAM cells of the green pixels. The red pixels are not coupled to the red-green bit-line 711 (i.e., activated) because they are coupled to the red-X word-line 731.

The implementation shown in FIG. 7 provides square clusters with versatility in adjusting the color channels but uses fewer word-lines than the other implementations (see FIG. 6), which may have advantages in reducing circuit complexity. The implementations illustrated here cover some, but not all, of the possible variations of the disclosed display. For example, different cluster configurations including different pixel layouts and/or different number of pixels may be used with the techniques described herein.

Figure 8:
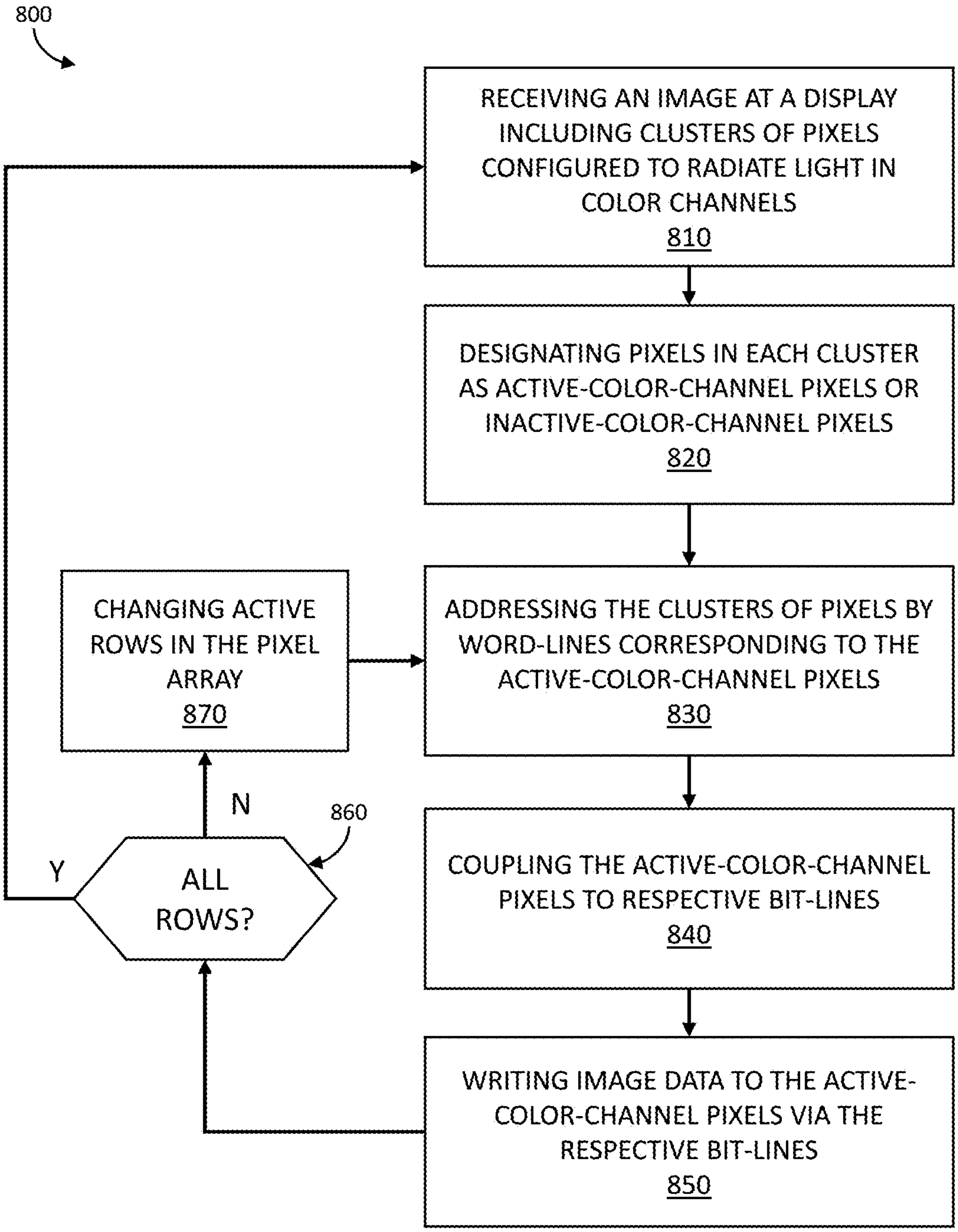
FIG. 8 is a flowchart of a method for controlling pixels in a display according to a possible implementation of the present disclosure.

FIG. 8 is a flowchart of a method for controlling pixels in a display according to a possible implementation of the present disclosure. The method 800 includes receiving 810 an image at a display (e.g., micro-LED display) including clusters of pixels configured to radiate light in color channels (e.g., red, green, blue). The method 800 further includes designating 820 pixels in each cluster as being in a color channel that is active (i.e., active-color-channel pixel) or as being in a color channel that is inactive (i.e., inactive-color-channel pixel). For example, the active/inactive color channels may be based on the image. In another example, the active/inactive color channels may be based on a power mode (e.g., selected from a high-power mode or a low-power mode) of the display. In yet another example, the active/inactive color channels may be based on a light condition of an environment of the display. The method 800 further includes addressing 830 the clusters of pixels by word-lines corresponding to the active-color-channel pixels. Conversely pixels of word-lines corresponding to the inactive-color-channel pixels may not be addressed, which can reduce the power consumed by the display. The method 800 further includes coupling 840 the active-color-channel pixels to respective bit-lines. For example, each bit-line in the pixel array may correspond to one of the color channels. The method 800 further includes writing 850 image data (e.g., bit-plane data) to the active-color-channel pixels via the respective bit-lines.

The method 800 can be performed iteratively (row-by-row) for all rows of the display. Accordingly, if all rows have not been written to 860 then the method 800 can include changing 870 the active row in the pixel array and repeating the process to write image data to the active color channels pixels of the new row. When all rows have been written the image is displayed, and a new image may be received at the display. The process of designating active/inactive color channels may be repeated before rendering the new image.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A display comprising:
- a pixel array configured to radiate light in color channels, the pixel array including:
  - pixels organized into clusters, the clusters arranged in rows and columns and each cluster is configured to radiate the color channels via a blue pixel, a green pixel, a first red pixel, and a second red pixel;
  - a plurality of bit-lines corresponding each column, wherein each bit-line corresponds to at least one of the color channels of a respective column; and
  - a plurality of word-lines corresponding to each row including a first word-line coupled to the blue pixel and the green pixel in each cluster of a row and a second word-line coupled to the first red pixel and the second red pixel in each cluster of the row; and
- a display controller configured to:
  - determine which color channels are active color channels; and
  - address pixels corresponding to the active color channels to display an image received at the display.

2. The display according to claim 1, wherein the display controller is further configured to:
- determine which of the color channels are inactive color channels; and
- not address the pixels corresponding to the inactive color channels to reduce a power consumed by the display while displaying the image.

3. The display according to claim 1, wherein the active color channels are based on the image received at the display.

4. The display according to claim 1, wherein the display controller is further configured to:
- detect that the image is part of a video stream; and
- determine that all of the color channels are the active color channels based on the detection.

5. The display according to claim 1, wherein the active color channels are based on a power mode of the display.

6. The display according to claim 5, wherein the active color channels include:

all of the color channels when the power mode is a high-power mode; and one color channel when the power mode is a low-power mode, wherein the high-power mode and the low-power mode are based on a battery level of a device into which the display is integrated.

7. The display according to claim 1, wherein the active color channels are based on a light condition of the display.

8. The display according to claim 7, wherein the active color channels include:

all of the color channels when the light condition is above a bright light threshold; and one of the color channels when the light condition is below the bright light threshold.

9. The display according to claim 1, wherein the active color channels are based on a user input.

10. The display according to claim 1, further comprising:

a bit plane sequencer configured to output a sequence of bit planes for each color channel based on the image received at the display.

11. The display according to claim 1, wherein the plurality of bit-lines for each column include:

a bit-line corresponding to at least one color channel of the display, the bit-line coupled to the pixels in each cluster of a column that correspond to the at least one color channel.

12. The display according to claim 11, further comprising:

a plurality of bit-line drivers coupled to groups of bit-lines, each group of bit-lines corresponding to a color channel of the display, wherein only bit-line drivers of the active color channels are addressed to reduce a power consumed by the display.

13. The display according to claim 1, wherein the pixels each include:

a micro-LED; and a static random access memory (SRAM) cell, wherein an ON/OFF state of the micro-LED is based on a state of the SRAM cell.

14. A method comprising:

receiving an image at a display including clusters of pixels configured to radiate light in color channels via a blue pixel, a green pixel, a first red pixel, and a second red pixel;

designating pixels in each cluster as active-color-channel pixels or inactive-color-channel pixels;

addressing the clusters of pixels by word-lines corresponding to the active-color-channel pixels to couple the active-color-channel pixels to respective bit-lines, wherein each row includes a a first word-line coupled to the blue pixel and the green pixel in each cluster of a row and a second word-line coupled to the first red pixel and the second red pixel in each cluster of the row; and writing image data to the active-color-channel pixels via the respective bit-lines to display the image.

15. The method according to claim 14, wherein designating the pixels in each cluster as the active-color-channel pixels or the inactive-color-channel pixels is based on the image.

16. The method according to claim 14, wherein designating the pixels as the active-color-channel pixels or the inactive-color-channel pixels includes:

selecting a power mode of the display; and designating the active-color-channel pixels or the inactive-color-channel pixels based on the power mode.

17. The method according to claim 16, further comprising:

measuring a light condition of an environment of the display; and selecting the power mode of the display based on the light condition.

18. A static random access memory (SRAM) display, the SRAM display comprising:

clusters arranged in rows and columns, the clusters including blue pixels, green pixels, first red pixels, and second red pixels;

a plurality of word-lines corresponding to each row including a first word-line coupled to the blue pixels and the green pixels of the clusters in a row and a second word-line coupled to the first red pixels and the second red pixels of the clusters in each row; and a display controller configured to:

deactivate the second word-line to conserve power; and render an image using the blue pixels or the green pixels coupled to the first word-line.

19. The SRAM display according to claim 18, further comprising:

a bit plane sequencer configured to output a sequence of bit planes for each color channel based of the image received at the SRAM display; and a plurality of bit-line drivers, each bit-line driver corresponding to a color channel of the SRAM display.

* * * * *